June 9, 1931.  L. H. GLADWIN ET AL  1,809,802
METHOD OF BUILDING CONDUITS
Filed April 15, 1929
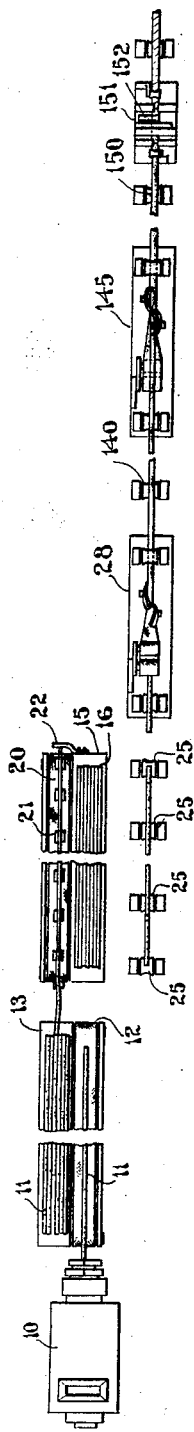
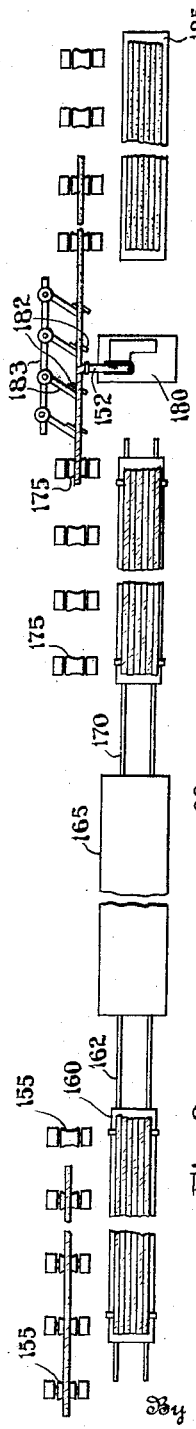
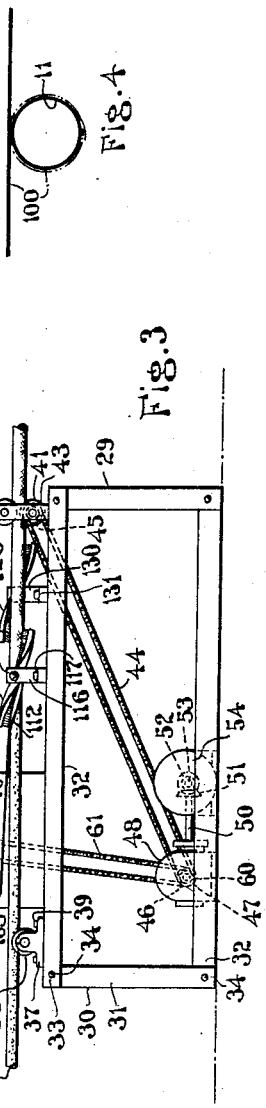
Inventor
Louis H. Gladwin
Nigel G. Bruce
By
Attorney Patented June 9, 1931

1,809,802

UNITED STATES PATENT OFFICE

LOUIS H. GLADWIN, OF AKRON, OHIO, AND NIGEL G. BRUCE, DECEASED, LATE OF AKRON, OHIO, BY ELIZABETH W. BRUCE, ADMINISTRATRIX, OF AKRON, OHIO, ASSIGNORS TO THE GOODYEAR TIRE & RUBBER COMPANY, OF AKRON, OHIO, A CORPORATION OF OHIO

METHOD OF BUILDING CONDUITS

Application filed April 15, 1929. Serial No. 355,324.

This invention relates to the manufacture of conduits and it relates particularly to a method of manufacuring conduits composed of rubberized material.

The object of the invention is to provide a novel and efficient process of manufacturing rubber conduits, the several steps of the process being initiated in rapid succession and a number of different steps of which can be performed simultaneously.

Heretofore, an ordinary method of manufacturing hose involved the extrusion of a tube of rubber compound and thereafter the disposition of it on a cylindrical mandrel of corresponding diameter. One or more layers of rubberized fabric then were wrapped about the tube, usually by separate operations, each of which comprised rolling the mandrel and tube over a strip of fabric having a width slightly greater than the circumferential length of the tube. Thereafter, the mandrel with the tube and fabric thereon were wrapped with non-rubberized fabric and vulcanized. Subsequently, the latter fabric was removed and the hose stripped from the mandrel. While this method has been employed successfully, it has been attended with considerable expense, owing to the time and labor required in effecting the several steps thereof.

In one embodiment of the invention, after the rubber tube has been disposed on the mandrel, the several layers of rubberized fabric and the layer of non-rubberized fabric employed in curing the hose are applied during a continuous longitudinal movement of the mandrel. This is effected by a series of machines arranged in longitudinal alignment, each of which performs a certain function in the construction of the hose. Following these operations, the hose is vulcanized, the wrapping fabric removed, and the hose stripped from the mandrel.

For a better understanding of the invention, reference may now be had to the accompanying drawings, forming a part of this specification, in which:

Fig. 1 is a fragmentary plan view showing diagrammatically several of a series of mechanical units employed in practicing the invention;

Fig. 2 is a view similar to that of Fig. 1 illustrating the remainder of the series of units employed in practicing the invention;

Fig. 3 is a side elevational view, on a larger scale, of one of the units employed for folding a layer of fabric about a mandrel; and Fig. 4 is a cross-sectional view of a mandrel having a strip of material applied thereto according to the invention.

Referring to Fig. 1, the first unit of the machines employed in practicing the invention comprises an extruding machine 10 from which a tube of rubber 11 is extruded upon an endless conveying belt 12. When the tube has been extruded to a predetermined length, for example, a length of fifty feet, it is severed adjacent the extruding machine and moved laterally to a table 13 disposed parallel to the belt 12. A second table 15, aligned with the belt 12 but spaced from the end thereof, carries a plurality of cylindrical mandrel 16. One of these mandrels is transported to a conveyor 20 mounted on one side of the table 15, which has spaced V-shape rubber members 21 secured to its outer surface for supporting the mandrel. Thereafter, the conveyor moves the mandrel until one end of the latter abuts a bracket 22, secured to the end of the table 15 remote from the table 12 and further longitudinal movement of the mandrel is prevented, although movement of the conveyor 20 continues. The end of the tube 11 adjacent the extruding machine now is temporarily closed and compressed air admitted into it through its open end, thereby slightly expanding the tube, whereafter the latter end of the tube is moved over the end of the mandrel adjacent thereto in encircling relation therewith. Movement of the conveyor 20 toward the bracket 22 results in the members 21 successively engaging the tube on the mandrel and carrying it relative thereto until the entire tube encloses the latter.

Following this operation, the mandrel and the tube are transported to a series of aligned but spaced grooved rollers 25 and move over these rollers into a machine 28 adapted to fold fabric thereon. As best shown by Fig. 3, this machine comprises a framework 30, composed of lower and upper horizontal frame members 32 and 33 joined at their ends to vertical frame members 29 and 31. The mandrel during its movement through the machine 28, is supported on the frame 30 by a grooved roller 38 journaled in a bearing bracket 37 secured by bolts 39 to the end of the frame adjacent the rollers 25. Also, the mandrel passes between a pair of vertically spaced grooved rollers 40 and 41 journaled in a bracket 42 secured by bolts 43 to the end of the frame opposite the roller 38. The roller 41 is driven by a chain 44 trained about a sprocket 45, rigidly secured thereto, while the chain in turn is trained about a sprocket 46 secured on a shaft 47 forming part of a reduction gearing 48 disposed adjacent the horizontal frame member 32. A second shaft 50, projecting from the reduction gearing 48, is provided with a bevel gear 51, which meshes with a complementary gear 52 secured on the shaft 53 of a motor 54. The shaft 47 also is provided with a sprocket 60 about which a chain 61 is trained. This chain in turn is trained over a sprocket 62 rigidly secured on a shaft 63 journaled in a frame plate 64 that projects vertically above the horizontal frame 30.

The shaft 63 also is provided with a gear 65 which meshes with a gear 66 rigidly secured on a shaft 67. The latter is disposed parallel to the shaft 63 and is also journaled in the frame plate 64. A chain 71, trained over a sprocket 70 on the shaft 67, in turn extends about a sprocket 72 secured on a shaft 73 journaled in a laterally projecting portion 74 of the frame plate 64. In turn the shaft 73 is provided with a roller 77 that is rigidly secured thereon and is adapted to drive a roller 80 by peripheral contact therewith. A shaft 81, for supporting the latter roller, is journaled in the end of an arm 82 that is pivoted on a shaft 83 journaled in the upper portion of the frame plate 64. The roller 80 rests upon the roller 77. A roll of fabric 100 wound with a liner 101 is supported on the shaft 83 and the liner is adapted to be wound upon the roller 80 as fabric is unwound from the roll 100. As the fabric leaves the roll 100, it is directed under a roller 102, rigidly mounted on the shaft 63, thence over a roller 103 rotatable on a shaft 104 that is journaled in the frame plate 64, and thence upon the mandrel 16.

One half of the width of the fabric then is folded laterally about the mandrel by a spirally formed brush 110 composed of a bar 111 having bristles 112 on its inner surface. This bar is secured by a bolt 115 to a bracket 116, in turn secured by a bolt 117 to the frame 30. Since the diameter of the semi-convolution formed by the inner surface of the brush is slightly less than the diameter of the mandrel, as the mandrel passes through the brush, pressure will be exerted thereupon by the bristles for folding the fabric firmly about the mandrel in the form shown by Fig. 4. The other half of the fabric in turn is folded about the mandrel by a spirally formed brush 125 composed of a bar 126 having bristles 127 on its inner surface. This brush is supported on a bracket 130 secured by a bolt 131 to the frame 30 in spaced relation to the brush 111. It is formed oppositely to that of brush 111, however, and hence, folds the other half of the fabric about the mandrel in a direction reversely to the folding of the first half thereof. Owing to the fact that the fabric is fed upon the mandrel in a horizontal plane disposed thereabove, it is apparent that the brushes fold the fabric in such manner that the seam thereof is disposed on the lower side of the mandrel.

Following the movement of a short length of the mandrel 16 through the machine 28 and the application of the first layer of fabric on this portion, it moves over a roller 140 similar to the rollers 25, and through a second unit 145, adapted to fold a second layer of fabric thereabout. This machine is identical with the machine 28, with the exception that the roll of fabric is disposed below the mandrel and hence, fabric is fed thereto in a horizontal plane beneath the mandrel. Also, the brushes are disposed oppositely to the brushes in the machine 28 in order to accommodate the fabric fed to the mandrel from a position below it. Moreover, the seam of this layer of fabric will be disposed on the upper surface of the mandrel in a position opposite to the seam resulting from the application of the first layer of fabric. It is to be understood, however, that more than two of the fabric folding units may be employed and that the rolls of fabric and the brushes may be disposed in such relation that the seams will be located equally about the periphery of the mandrel.

Following the application of the second layer of fabric to the aforesaid portion of the mandrel, the latter moves over a roller 150 and through a machine 151 for wrapping it with a fabric strip 152 for the purpose of facilitating vulcanization of the article. This machine may be of any suitable construction but preferably it is similar to a machine such as that disclosed in the patent to Prouty et al., No. 1,490,481, patented April 15, 1924.

After the mandrel is covered with spiral wrapping fabric, it is transported on additional supporting rollers 155 to a truck 160. After a number of mandrels are assembled upon the truck, the latter is rolled upon tracks 162 into a vulcanizer 165. Following a lapse of time sufficient to insure proper vulcanization of the hose on the mandrels, the truck 160 is rolled from the opposite end of the vulcanizer upon other tracks 170.

Thereafter, the mandrels individually are transported to other rollers 175 disposed in alignment with the rollers 155. Each mandrel then is conducted over these rollers through a machine 180 adapted to unwind the outer layer of fabric 152 therefrom. While the fabric 152 is being unwound from each mandrel, the latter is supported and moved forward by means of rollers 182 which are journaled upon a framework 183. It will be observed that the axes of the rollers 182 are disposed at an angle to the axis of the supported mandrel. Preferably the machine employed for unwinding the fabric is similar to that disclosed in the patent to Derry, No. 1,674,278, patented June 19, 1928. Following removal of this fabric, each mandrel is transported to a table 185 and the hose stripped therefrom.

From the foregoing description, it is apparent that the method provided for manufacturing hose constitutes a series of steps substantially continuous in nature. Consequently, there is less time lost in transporting the mandrel between the different operations, resulting in a corresponding decrease in the expense of manufacturing hose. Moreover, the layers of fabric are novelly applied to the hose with rapidity and precision.

Although we have illustrated only the preferred form of the invention and have described that form in detail, it will be apparent to those skilled in the art that the invention is not so limited but that various modifications may be made therein without departing from the spirit of the invention or from the scope of the appended claims.

What we claim is:

1. A method of manufacturing hose composed of rubberized material which comprises extruding a tube of rubber, disposing it on a cylindrical mandrel, successively folding a plurality of layers of rubberized fabric laterally about the mandrel during a continuous longitudinal movement of the latter, spirally winding a strip of fabric about the mandrel during its aforesaid movement but subsequent to the application of the rubberized fabric, vulcanizing the hose and thereafter removing the last mentioned fabric.

2. A method of manufacturing hose which comprises successively folding a plurality of layers of rubberized fabric laterally about a cylindrical mandrel during a continuous longitudinal movement of the latter and at the same time applying resilient pressure to that part of the fabric being folded substantially at every point to insure complete stitching of one ply to a preceding ply, spirally winding a strip of non-rubberized fabric about the mandrel during its aforesaid movement but subsequent to the application of the rubberized fabric, vulcanizing the hose, and thereafter removing the fabric last applied.

3. A method of manufacturing hose which comprises extruding a tube of rubber, disposing it on a cylindrical mandrel, successively folding a plurality of layers of rubberized fabric laterally about the mandrel during a continuous longitudinal movement of the latter, and in such manner that the seams of the several layers are disposed in peripherally spaced relation, spirally winding a strip of non-rubberized fabric about the mandrel during its aforesaid movement but subsequent to the application of the rubberized fabric, vulcanizing the hose, and thereafter removing the fabric last applied.

4. A method of manufacturing hose which comprises extruding a tube of rubber, disposing it on a cylindrical mandrel, successively folding a plurality of layers of rubberized fabric laterally about the mandrel during a continuous longitudinal movement of the latter and in such manner that the seams of the several layers are disposed in peripherally spaced relation, and simultaneously with the folding operation, applying resilient pressure at all points to that part of the fabric being folded in order that each strip of fabric will be thoroughly stitched to a preceding strip, winding a strip of non-rubberized fabric about the mandrel during its aforesaid movement but subsequent to the application of the rubberized fabric, vulcanizing the hose, and thereafter removing the fabric last applied.

5. A method of manufacturing hose which comprises successively folding a plurality of layers of rubber material laterally about a cylindrical mandrel during continuous longitudinal movement of the latter, and at the same time applying resilient pressure to that part of the fabric being folded substantially at every point to insure complete stitching of one ply to the preceding ply, applying a confining member to the outer surface of the assembly, vulcanizing the hose and thereafter removing the confining member.

In witness whereof, we have hereunto signed our names.

Signed at Akron, in the county of Summit and State of Ohio, this 12th day of April, 1929.

LOUIS H. GLADWIN.
ELIZABETH W. BRUCE,
*Administratrix of the Estate of Nigel G. Bruce, Deceased.*